United States Patent Office 2,854,858
Patented Oct. 7, 1958

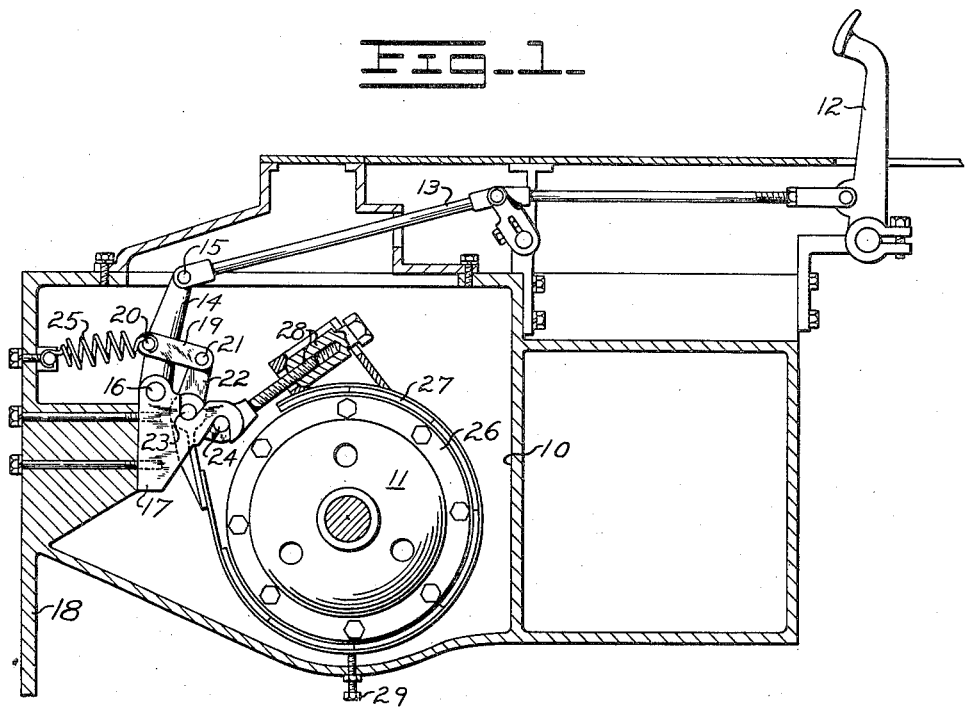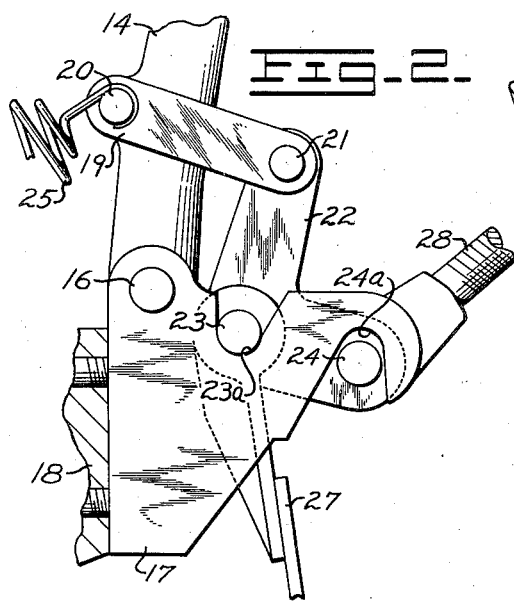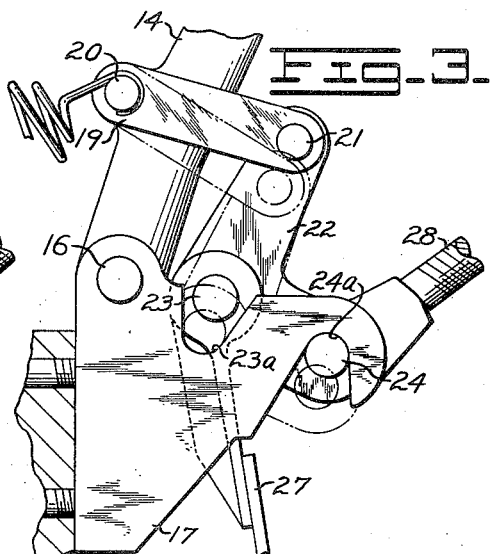

2,854,858

CONTROL LINKAGE FOR A BAND TYPE BRAKE

Max E. Butterfield and Norman E. Risk, Peoria, Ill., assignors to Caterpillar Tractor Co., Peoria, Ill., a corporation of California Application April 30, 1954, Serial No. 426,848

1 Claim. (Cl. 74—512)

This invention relates to the control linkage used to apply pressure to a band type brake, particularly those employing an actuating lever having a pair of anchor pins as pivot means which selectively serve as centers of pivotal movement depending upon the direction of rotation of the brake drum.

In brake control linkages formerly used to rock the actuating lever about either of the pivots, an objectionable recoil action was transmitted to the operator when the center of pivotal movement of the actuating lever changed from one anchor pin to the other. With this type of actuating lever, one pin serves as the center of pivotal movement as the brake is applied with the brake drum rotating in a clockwise direction, and the other pin as the pivot while the brake drum is rotating in a counter-clockwise direction.

In tensioning a brake band, it is advantageous to apply the force in the same direction as the brake drum is rotating since the band will tend to wrap around the drum as a result of friction, and less applied force is required to obtain the desired braking action. Therefore, control linkages for band type brakes usually employ an actuating lever having a pair of anchor pins.

The object of this invention is to provide a control linkage for a band type brake, employing a floating toggle link in combination with an actuating lever having a pair of pivot means to minimize any recoil action or "kickback" transmitted to the operating pedal.

In the drawings:

Fig. 1 is a vertical section through the steering clutch compartment of a tractor, showing a steering brake drum encircled by a band type brake and control linkage embodying the invention in the fully retracted position;

Fig. 2 is an enlarged view of the toggle link and actuating lever showing the position of the actuating lever as it pivots about one anchor pin as the brakes are initially applied;

Fig. 3 is an enlarged view of the actuating lever showing its position in phantom lines as it pivots about one anchor pin before the brake band has fully contacted the brake drum; and the toggle link and actuating lever shown in solid lines after the center of pivotal movement has shifted to the other anchor pin.

In Fig. 1 a portion of the chassis of a tractor is shown having a steering clutch compartment 10 enclosing a conventional steering clutch 11 commonly used in track-type tractors where the clutch is disengaged on the side toward which a turn is made. It has been common practice to employ a band type brake to stop the driven clutch drum of the disengaged clutch.

Since it is advantageous to apply the tensioning force in a band type brake in the same direction as the brake drum is rotating, and since a tractor is used in both forward and reverse, an actuating lever having a pair of anchor pins as pivotal means has been employed in previous brake control linkages so that the tensioning force may be applied from either end of the brake band, depending upon the direction of rotation of the steering clutch and its associated brake drum.

Movement of a pivoted pedal 12 or lever in a clockwise direction will pull a brake rod shown at 13 toward the right, as viewed in Fig. 1. An intermediate lever 14 pivotally connected to the brake rod at 15 will then be rocked about a stationary pivot pin 16 supported in an anchor pin bracket 17, secured to a wall 18 of the steering clutch compartment. A floating toggle link 19 is pivotally supported at one end by a pin 20 located intermediate the ends of lever 14, and pivotally connected by a pin 21 at the other end to a bell crank 22 provided as a brake actuating lever. This actuating lever has a pair of spaced anchor pins 23 and 24 which serve as pivot means as the brakes are applied by depressing the pedal 12.

These anchor pins are normally seated in their respective sockets 23a and 24a provided in the bracket 17. A return spring 25 secured at one end to the wall 18 and to the pin 20 at the other end retains the anchor pins in their respective sockets when the brake is fully released as shown in Fig. 1. A brake drum 26 secured to the driven part of the steering clutch 11 is encircled by a brake band 27 having one end secured to anchor pin 23 and the other end secured to the anchor pin 24. Conventional adjusting screws are shown at 28 and 29 to insure uniform contact of the brake band about the drum as the brake pedal is depressed a predetermined distance.

Either pin 23 or 24 may be selected as the initial center of pivotal movement of the actuating lever by a change in the relative positions of the pivot pins 21, 23, and 24. Regardless of the direction in which the tractor is traveling, and consequently the direction of rotation of the steering clutch, the same anchor pin will leave its socket first as the brakes are initially applied.

In this particular linkage the geometry is such that anchor pin 24 will leave its socket first upon the brake pedal being depressed. The position of the actuating lever 22 upon the initial depressing of the brake pedal is shown in Fig. 2 with anchor pin 23 acting as the pivot point while pin 24 is forced from its socket 24a to tighten the brake band about the drum. Assuming that the steering clutch brake drum is rotating in a counter-clockwise direction, upon depressing the brake pedal and consequently tightening the brake band, the friction between the band and the brake will result in the band attempting to rotate in the same direction as the brake drum; therefore, anchor pin 23 will remain in its socket as the brake pedal is depressed further during the braking cycle, and there will be no change of pivot points.

Assuming the tractor is now going in an opposite direction, which is common during various operations, especially bulldozing, and the steering clutch brake drum is rotating in a clockwise direction, the position of the actuating lever 22 will be the same as that shown in Fig. 2 upon the initial depressing of the brake pedal; however, as the brake band contacts the brake drum the band will be carried with the drum in a clockwise direction and pull the anchor pin 24 back into its socket and lift the other pin 23 from its socket, causing an upward and slightly counter-clockwise movement of the actuating lever 22. In previous linkages not having a floating toggle link, but having the brake rod connected to the actuating lever, this shifting of the anchor pins in their sockets as the brake lining moved with the brake drum was not simultaneous. The pin 24 would first be returned to its respective socket before pin 23 was lifted which caused a recoil action or "kick back" in the brake control linkage which was also transmitted to the operator's foot or arm.

By providing an intermediate lever 14 which is rocked about a stationary pivot 16, and a floating toggle link 19 pivoted in such a manner that a line drawn through the centers of the pivots 20 and 21 is substantially parallel with a line drawn through the centers of the anchor pins 23 and 24 in the fully retracted position, this movement of the actuating lever 22 caused by the shifting of the anchor pins can be absorbed within the control linkage and prevent any recoil, or "kick back," from being transmitted to the brake pedal.

By also positioning the stationary pivot 16 on a line drawn through the center of the one toggle link pivot 20 which is substantially parallel to a line drawn through the center of the other toggle link pivot 21 and a point equidistant between the anchor pins 23 and 24, the actuating lever 22 is allowed to move upwardly and rocked a slight amount in a counter-clockwise direction as the center of pivotal movement of this lever changes from anchor pin 24 to anchor pin 23 or from pin 23 to pin 24.

As shown in Fig. 3, when the brake band has fully contacted the brake drum and is rotated in a clockwise direction, the actuating lever 22 is lifted from the position shown in phantom lines to the position shown in solid lines until anchor pin 24 is seated. The toggle link 19 is then swung in a substantially true arc from the position shown in phantom lines to the position shown in solid lines and the position of intermediate lever 14 is not affected by this shift of anchor pins. Consequently no recoil action is transmitted to the brake pedal.

Assuming that the tractor is stopped on an incline by a full application of the brake and one anchor pin is held in its socket by the brake drum attempting to turn in a given direction as the force of gravity tends to pull the tractor down the incline, a shift of the anchor pins also occurs when the tractor is again started moving up the incline with the brakes partially applied to prevent the engine from being momentarily overloaded. Since the direction of rotation of the brake drum as the tractor moves up the incline is opposite to that when gravity tends to pull it down, the brake band is carried with the drum until the other anchor pin seats. In previous control linkages, this recoil action was more severe than that occurring during a stop on level terrain since the brake has been fully applied in one direction before the anchor pins shifted. When a tractor using the control linkage disclosed is stopped on an incline and subsequently started, the actuating lever is in approximately the same positions as shown in Fig. 3 and described above. Therefore, the operator experiences no "kick back" as the anchor pins change position.

We claim:

In a control linkage for a band type brake having an actuating lever provided with a pair of anchor pins, means selectively engageable by said pins so that either pin may serve as a center of pivotal movement of said lever as a brake drum changes direction, an intermediate lever supported at one end by a stationary pivot pin and pivotally connected to a brake rod at the other end, and a floating toggle link pivoted at one end by a pin between the pivots of the intermediate lever and pivotally connected to the actuating lever in such a manner that a line drawn through the centers of the pivot pins of said floating toggle link is substantially parallel with a line drawn through the centers of the anchor pins, and a line drawn through the center of the stationary pivot and the toggle link pivot in said intermediate lever is substantially parallel with a line drawn through the toggle link pivot in said actuating lever and a point equidistant between the anchor pins whereby the floating link will swing in an arc about the pivotal connection on the intermediate lever as the center of pivotal movement of the actuating lever changes from one anchor pin to the other.

References Cited in the file of this patent

UNITED STATES PATENTS

| 1,297,093 | Carr | Mar. 11, 1919 |
| 2,580,381 | Banker | Jan. 1, 1952 |

FOREIGN PATENTS

| 631,728 | France | Dec. 26, 1927 |
| 469,802 | Germany | July 21, 1927 |
| 11,850 | Great Britain | June 30, 1900 |
| 707 | Great Britain | Jan. 10, 1911 |